C. JILLSON.

Calipers.

No. 43,854.

Patented Aug. 16, 1864.

Attest

Inventor

UNITED STATES PATENT OFFICE.

C. JILLSON, OF WORCESTER, MASSACHUSETTS.

IMPROVEMENT IN CALIPERS.

Specification forming part of Letters Patent No. 43,854, dated August 16, 1864.

*To all whom it may concern:*

Be it known that I, C. JILLSON, of the city and county of Worcester, and State of Massachusetts, have invented certain new and useful Improvements in a Combined Inside and Outside Caliper and a Divider; and I do hereby declare the following to be a full, clear, and exact description of the same, reference being had to the accompanying drawings, making a part of this specification, in which—

Figure 1:
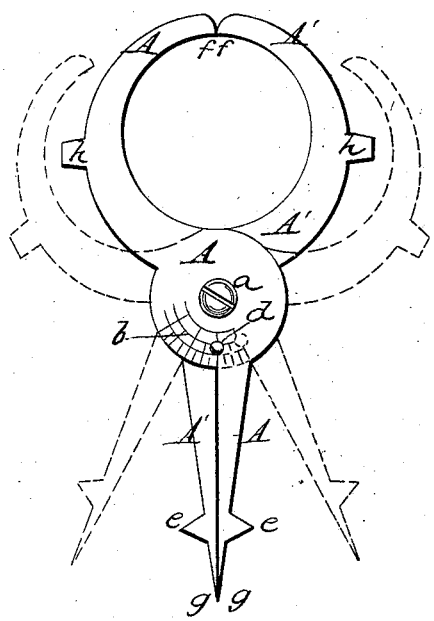
Figure 2:

Figure 1 represents a front view of the caliper and divider as closed, in black lines, and as spread open, in red lines. Fig. 2 is an edge view of the instrument.

My caliper is of the kind known as "registering calipers"—that is to say, it can be set and clamped by a scale, and is so made as to register accurately, however wide it may be spread within its capacity, and the pieces of which it is composed, being of the same form, can be cut out by one single die or former. By connecting the divider with the caliper one single instrument is made of the two, which are so much used together.

My invention consists of an inside and outside caliper and divider in one and the same instrument, as will be explained.

The two parts or legs of the instrument A A' are of the same form, and pivoted together, as at *a*. Upon one of the legs or sweeps A, and near the pivoted point, there is a scale, *b*, by which the instrument can be set. I use no pointer or hand in connection with the scale, but cause the legs, as shown in red, to perform the duty of a hand or indicator, they spreading radially in accordance with the radial lines of the scale. Thus, making the legs serve the purpose of an indicating hand, I dispense with that hitherto-used part. A set-screw, *d*, passing through a curved slot in A and into the other portion, A', clamps the instrument when set.

*e e* are the points of the inside caliper, and have been used heretofore as such.

*f f* are the points of the outside caliper, and, being equidistant from the center or pivoted point *a*, will always show a uniform distance between them. The points *f f*, I make differently from any outside caliper-points I have ever seen or have any knowledge of. The universal way of making these outside points or bearing-surfaces has been to round or slope them from the inside of the bows toward the outside thereof. When so made, the registering by the scale is not perfect, because when widespread the touching points change, and consequently vary the dimensions according to the scale. If the points are brought out to a minute or delicate contact, they soon wear off, and the instrument is thus imperfect. They are therefore rounded off so as to make greater wearing-surface, and then, when rounded from the inside toward the outside, a radial or tangential line constantly varies its point of contact as the bows are spread apart or closed. Now, by curving the other way—that is, from the outside toward the inside—the touching or measuring points of the bows never change, however much they may be spread.

*g g* are the divider-points, they being made by prolonging and tapering the legs which carry the inside caliper points, *e e*. Thus I combine three useful and much-used-together instruments in one. I have also added to the bows of the outside caliper screw-drivers *h h*, which may be used or not with the instrument.

Having thus fully described the construction and operation of my combined calipers and dividers, what I claim therein as new, and desire to secure by Letters Patent, is—

1. Prolonging and forming upon the legs of the inside caliper the dividing-points *g g*, as and for the purpose described.

2. The rounding off of the points of the outside caliper from the outside toward the inside of the bows, when used in connection with a scale, for the purpose of more accurately registering the distance between the contact-points as the caliper is widened, as herein set forth and explained.

C. JILLSON.

Witnesses:
CHAS. M. RUGGLES,
JNO. A. DANA.